Oct. 3, 1967 D. SELWYN 3,345,571

RECEIVER APPARATUS

Filed Sept. 30, 1963 4 Sheets-Sheet 1

INVENTOR.
DONALD SELWYN

BY
OSTROLENK, FABER, GERB & SOFFEN
ATTORNEYS

INVENTOR.
DONALD SELWYN
BY
OSTROLENK, FABER, GERB & SOFFEN
ATTORNEYS

Oct. 3, 1967 D. SELWYN 3,345,571

RECEIVER APPARATUS

Filed Sept. 30, 1963 4 Sheets-Sheet 3

INVENTOR.
DONALD SELWYN

BY

OSTROLENK, FABER, GERB & SOFFEN

ATTORNEYS

Oct. 3, 1967 D. SELWYN 3,345,571

RECEIVER APPARATUS

Filed Sept. 30, 1963 4 Sheets-Sheet 4

INVENTOR.
DONALD SELWYN

BY

Ostrolenk, Faber, Gerb & Soffen

ATTORNEYS

United States Patent Office 3,345,571
Patented Oct. 3, 1967

3,345,571

RECEIVER APPARATUS

Donald Selwyn, 13 Yale Way, Oakland, N.J. 07436

Filed Sept. 30, 1963, Ser. No. 312,416
10 Claims. (Cl. 325—329)

ABSTRACT OF THE DISCLOSURE

A receiver system, capable of extracting intelligence from a variety of modulation types, including a multi-signal IF amplifier stage with controlled carrier signal insertion, and a multi-detection stage for the various modulation types.

My invention relates to a versatile receiver apparatus for receiving incoming signals of any of a plurality of modulation types commonly encoutered; and more particularly to a novel amplifier-demodulator arrangement for extracting intelligence from such a variety of signals in a simpler, less costly and more reliable manner than has heretofore been possible.

It is presently known to transmit intelligence bearing information in accordance with various modulation types, with a particular type of modulation being selected upon a joint consideration of such factors as: the nature and quality of the itelligence being transmitted, the distances such intelligence is to be transmitted, the proximity of similar intelligence bearing information in the radio frequency spectrum and the costs which may be involved. The modulation of the signal at the transmitter involves combining it with a higher frequency carrier signal to form a band of frequencies about the higher frequency waveform. After radiation by the transmission antenna and reception by an antenna remotely located at the receiver, the intelligence is then re-translated to its original frequency range by a demodulation, or detection, process, and is thereby made available for conversion to acoustic power and subsequent reception by the ear.

If the higher frequency radio wave is to convey the intelligence, some feature of that wave must of necessity be varied in accordance with the information to be transmitted. One well known way to do this, termed amplitude modulation, consists in varying the amplitude of the radiated wave in accordance with the characteristics of the intelligence to be transmitted thereon. The composite waveform generated thereby will have a carrier frequency component, with side bands symmetrically located thereabout, the frequency band occupied by each of the side bands corresponding to the frequency band of the intelligence being transmitted. This is the common modulation technique used in the conventional type of home broadcast receiver; for the transmission of the video portion of television signals; and numerous citizens' band signals.

It is known, however, that all the intelligence information is contained in one of the side bands. Hence, the retention of the other side band and carrier signal necessitates an increase in band width and transmission power. That is, the removal of the carrier and one of the side bands in the transmitter stage makes it possible to convey all the necessary intelligence information in a single side band signal, requiring a frequency band width only half that occupied by a modulated wave consisting of two side bands and the carrier, and permitting a saving of over two-thirds of the transmitter power. Further, the reduction of the effective band width of the receiver advantageously effects a reduction in the noise figure thereof. Hence, due to the presently crowded condition of the radio frequency spectrum and the power savings which may be effected, single side band communication has come into increasing usage.

Another type of well known modulation is frequency modulation, wherein the amplitude of the higher frequency carrier wave remains constant, with the frequency thereof being varied in accordance with the intelligence information to be transmitted. Frequency modulation has been found to be less susceptible to degradation of the intelligence signal by noise or other interfering signals, and accordingly has found wide scale usage in higher frequency communication systems requiring high quality reproduction of the intelligence signal.

In addition to the above modulation types, other techniques are known, such as single side band with full or reduced carrier level, double side band with carrier for selectable side band reception, double side band with reduced or suppressed carrier, continuous wave and phase modulation.

The utilization of such various types of modulation for the transmission of intelligence has accordingly necessitated various demodulation arrangements within the receiver apparatus. As, for example:

(1) The conventional type of AM receivers typically include a linear diode detector for deriving the modulation envelope of the received signal.

(2) FM or PM signals have necessitated the use of limiter and FM discriminator stages or a ratio detector to derive the intelligence information from the received signals.

(3) The reception of single side band signals with carrier, or double side band with carrier, for selectable side band application necessitates the use of a square law detector to derive the intelligence information therefrom in a low distortion manner.

(4) The reception of single side band or double side band with suppressed carrier, or continuous wave signals, necessitates the re-introduction or injection of a carrier signal within the receiver apparatus. This is normally accomplished within a product detector stage, having two inputs: (a) a frequency stabilized local oscillator signal, and (b) the incoming signal, suitably heterodyned down to the receiver IF frequency. These two inputs are simultaneously fed to dual inputs of the product detector, as for example separate grids, with the sum and difference signals thereof mixing to provide a mathematical product of the input signals, said product being the intelligence, or audio, beat frequency. The product detector output circuit is thoroughy bypassed with respect to the higher frequency IF signals to insure that only the product audio signals appear at the output.

Should it be desired to receive more than one modulation type within a single receiver, the practice has been to incorporate a multiplicity of such detector stages together with a rather formidable arrangement of switching circuitry to present the particular modulation type being received to its proper detection system. Hence, such multi-modulation receiver apparatus have imposed severe penalties upon the user with respect to increased size, weight, complexity, cost and decreased reliability.

My invention advantageously avoids these difficulties by providing a versatile demodulation system applicable in conjunction with all the numerous types of modulation to be encountered with only a minimum switching of components being necessary. The demodulation includes two basic stages, namely:

(1) A multi-signal amplifier, and
(2) A multi-purpose detector, each being of rather straightforward design and requiring a minimum number of circuit components.

The multi-signal amplifier in addition to amplifying the incoming signal, suitably heterodyned down to the IF frequency, includes provision for carrier signal injection when operating in conjunction with a modulation type requiring such additional signal injection prior to detection thereof (SSB-suppressed carrier, and CW). When operating in this manner, the amplifier is designed to maintain a substantially constant amplitude ratio between the amplified signals appearing at its output. More specifically, the amplification of the essentially fixed level carrier injection signal is automatically adjusted responsive to the incoming signal level so as to maintain such a constant ratio. Hence, the signals appearing at the output of the dual signal amplifier will combinedly synthesize a carrier and side band, with their predetermined ratio being adjusted to preferably lie within the range of 95% to 100% modulation.

When the multi-signal amplifier is operating in conjunction with a modulation type not requiring such carrier signal injection (e.g., conventional AM or FM reception), that stage will operate as a conventional type of IF amplifier. This is preferably achieved by bypassing the input terminal for the injected carrier signal to a fixed DC level (e.g. ground), but not bypassed at the frequency of the injected carrier signal. As, for example, should the carrier signal be injected to a secondary grid of an electronic tube, that grid may be connected to ground via an RF choke.

The output of the multi-signal amplifier stage may then be presented to a linear detector for AM and CW reception (with it being understood that the term AM as considered in conjunction with the detector stage includes double side band and single side band with full, reduced or suppressed carrier; with the carrier level being re-inserted within the previous multi-signal amplifier stage for reduced and suppressed carrier modulation types). In this regard, it is known that wherein single side band plus carrier signal is received, detection thereof with low distortion would necessitate a square law type detector. However, by reinserting the full carrier level, I have found that the distortion will be minimal and of little practical importance for most applications should the signal then be presented to a linear diode detector.

To further increase the versatility of my receiver, the detector stage to which the output of the multi-signal amplifier is presented may be selectively switched between AM and FM reception in an extremely simplified manner. More specifically, with the switch in the AM position, the stage operates as a linear diode detector sensitive to amplitude variations of the received signal for deriving the modulation envelope thereof. The throwing of a switch to the FM position modifies the diode bias supply in a manner rendering the circuit insensitive to amplitude modulation, resulting in the stage acting as a conventional type of ratio detector, achieving all its benefits with respect to noise reduction.

It is therefore seen that the basic concept of my invention resides in the employment of a novel amplifier stage and demodulator for combinedly deriving intelligence information from the numerous types of modulation signals presently encountered, with said modulation types including:

(1) Those having a sufficient carrier level for subsequent detection thereof;

(2) Those requiring carrier insertions within the receiver apparatus prior to detection;

(3) Those requiring a detector sensitive to amplitude variation; and (4) Those requiring a detector sensitive to frequency variations.

Hence, such a receiver advantageously avoids the complex and cumbersome abundance of separate detectors, together with their intricate switching arrangements, heretofore necessary to provide such multi-modulation operation.

As a further advantageous aspect of my invention, the manner in which the multi-signal amplifier of my invention operates permits conversion of existing double side band AM receivers for single side band operation in a relatively inexpensive and simple manner. More specifically, many radio amateur operators presently own good quality communication receivers which were originally designed for such AM communication work. With the increasing usage and popularity of single side band communication, the radio amateur has shown an increasing desire to convert his present receiver for single side band operation without necessitating the purchase of costly converters or the scrapping of his present equipment. My invention advantageously permits this by merely modifying the last IF stage within the existing receiver to operate as a proportional multi-signal amplifier. The carrier signal is injected into a low mu grid of that stage (e.g., the suppressor grid), while the incoming IF signal is still presented to the main control grid. When it is desired to operate the receiver for single side band reception, the signals presented to the modified amplifier stage would combine in accordance with my invention in a manner such that the constant ratio will be maintained between their output amplitude levels. Hence, the single side band signal is synthesized to form a signal having full carrier strength, which signal may then be presented to the existing linear detector of the receiver for derivation of the intelligence information therefrom.

When it is desired to operate the receiver with the reception of conventional AM signals (double side band with full carrier), the carrier signal injection oscillator is deactivated. In the absence of such carrier injection signal, that stage will operate as before, with the tube being biased to operate over the same portion of its characteristic curve as it was previously designed for. Thus, there is no need to switch any circuitry in or out when changing from conventional AM to SSB reception, with it being merely necessary to actuate or deactuate the carrier injection oscillator, as the case may be.

It is therefore seen that a primary object of my invention is to provide an improved receiver apparatus for the reception of incoming signals of a plurality of modulation types.

A further object of my invention is to provide a universal demodulation arrangement in a receiver apparatus, including a multi-signal amplifier for amplifying both the incoming IF signal and an injected carrier wave signal, while maintaining a substantially constant amplitude ratio therebetween.

Another object of my invention is to provide such a universal demodulation arrangement, wherein the output of said multi-signal amplifier stage is presented to a multipurpose detector stage having a simplified means for switching between AM and FM signal detection.

An additional object of my invention is to provide a receiver apparatus having the capabilities for demodulating signals of both full carrier strength and signals requiring an injected carrier prior to detection thereof; the receiver apparatus including a multi-signal amplifier stage for amplifying the received signal alone, in the former case, and amplifying the received signal and an injected carrier signal in the latter case, with a constant amplitude ratio being automatically maintained therebetween.

Still a further object of my invention is to provide such a receiver apparatus wherein the incoming signal and injected carrier signals are applied at separate terminals to an electronic device, suitably intercoupled such that the level of the incoming signal controls the degree of amplification of the carrier injected signals so as to maintain the aforesaid fixed proportional relationship therebetween.

Still another object of my invention is to provide a novel technique for retrofit converting an existing AM receiver to receive single side band intelligence.

Still an additional object of my invention is to provide a universal demodulator system including a detector circuit arrangement switchable between a linear detector and ratio detector, with a minimum change in circuitry thereof, so as to provide demodulation of both amplitude and frequency modulated signals.

These as well as other objects of my invention will readily become apparent upon a consideration of the following drawings in which.

Figure 3:
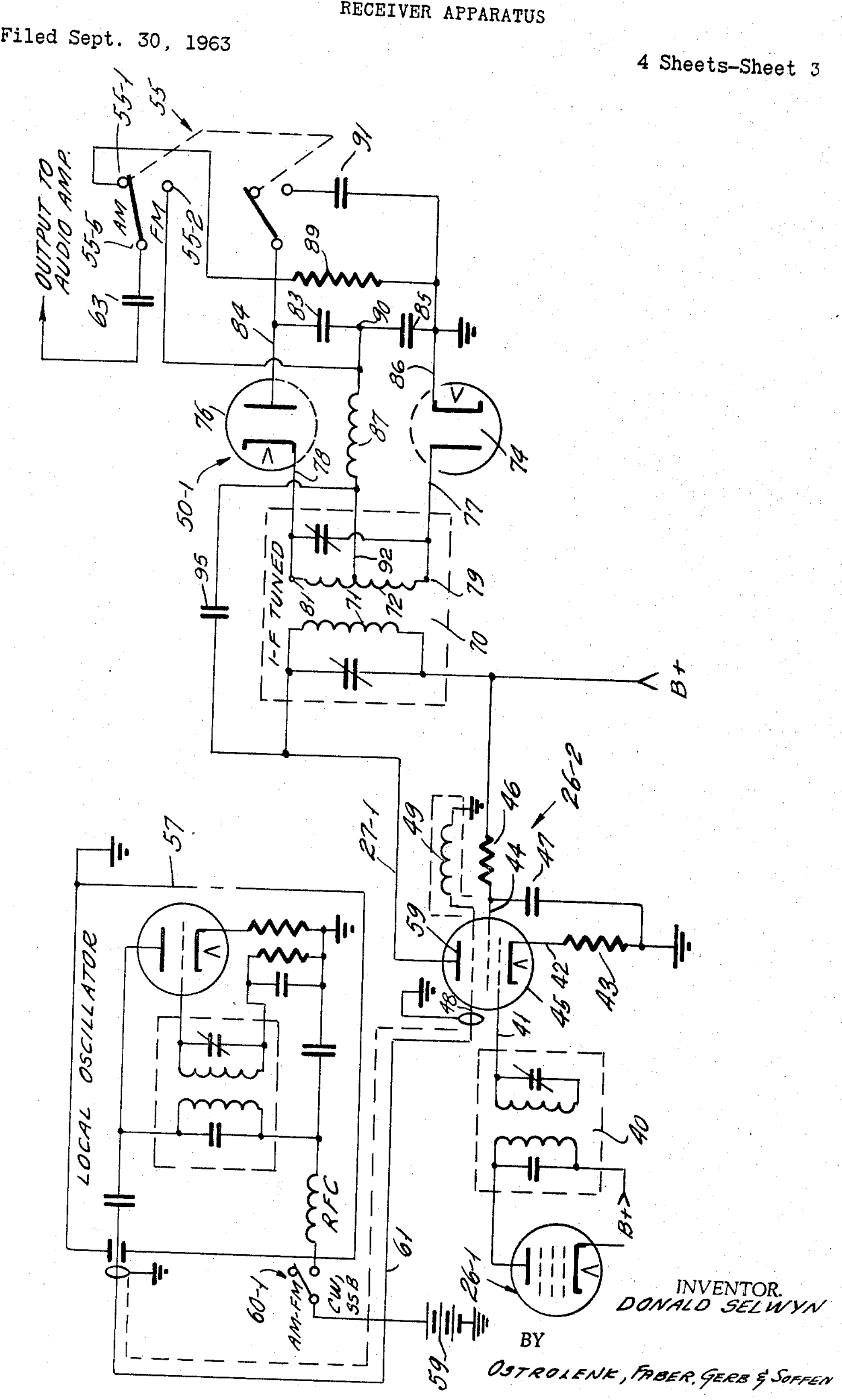

FIGURE 3 schematically illustrates one embodiment of the novel universal demodulator system constructed in accordance with the teachings of my invention and showing the use of electronic tubes.

Figure 4:
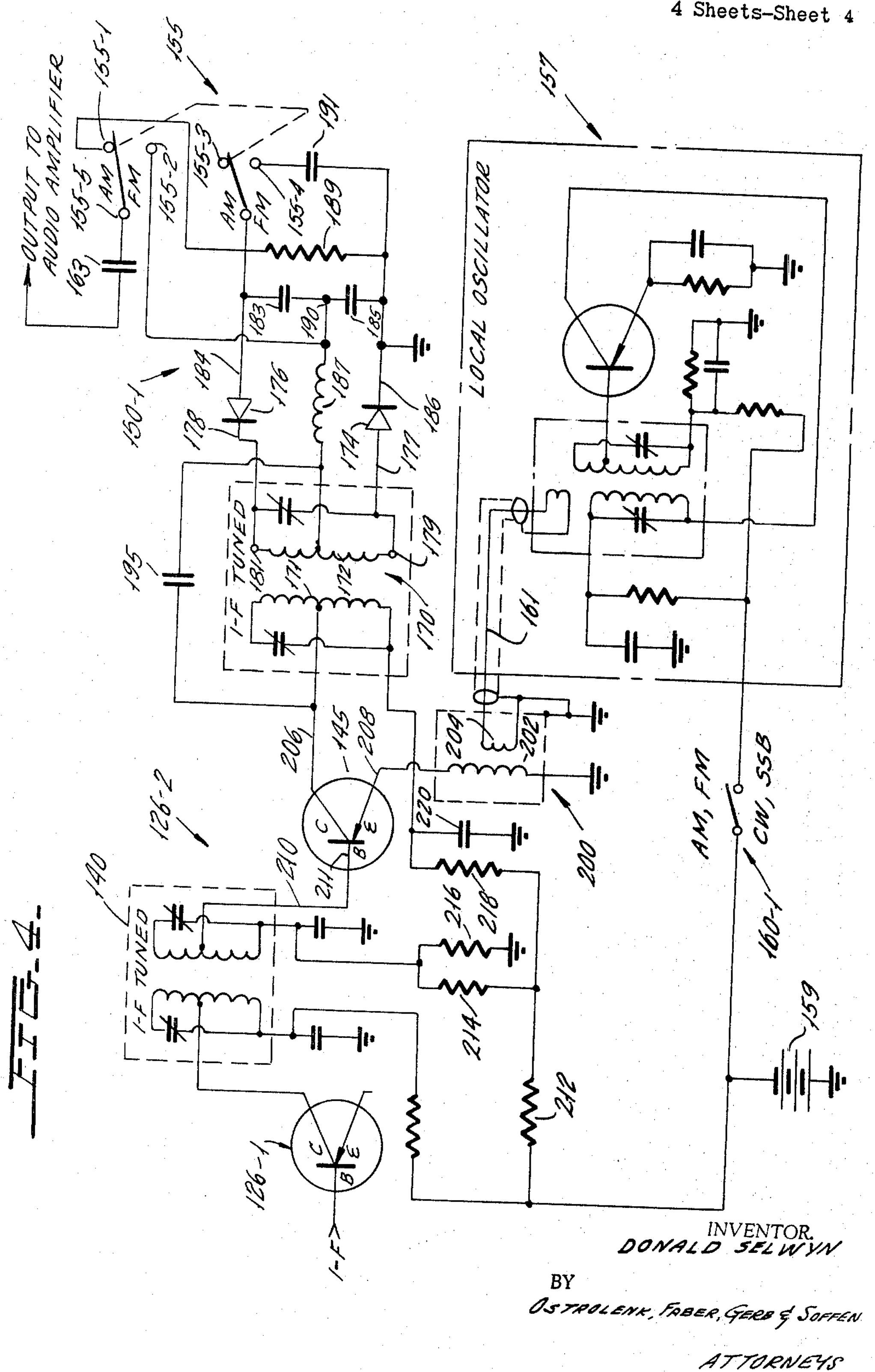

FIGURE 4 is a schematic representation of another embodiment of my universal demodulator, functionally similar to that shown in FIGURE 3, but utilizing solid state components.

Figure 1:
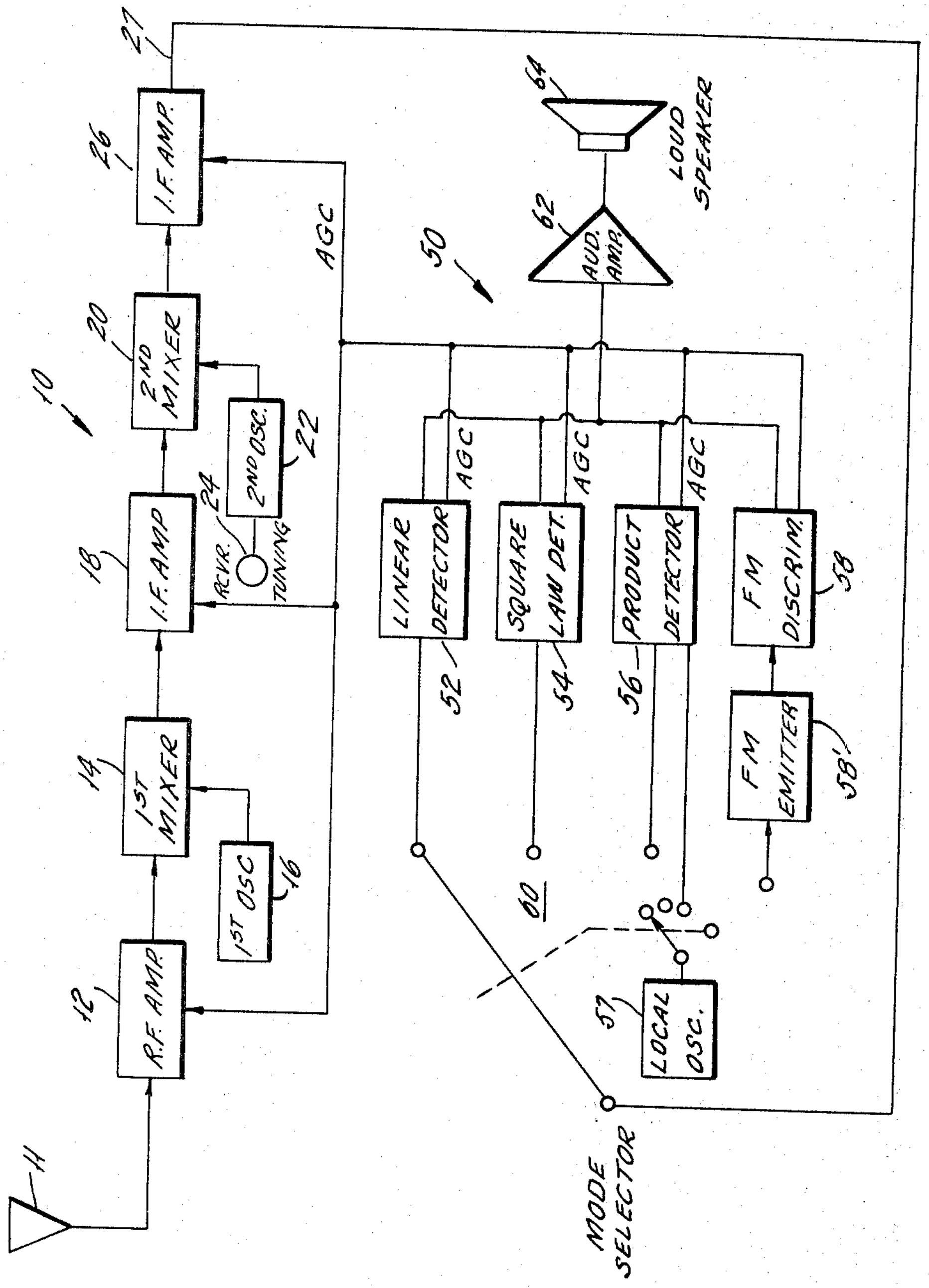
FIG. 1. PRIOR ART
FIGURE 1 is a block diagram of a typical multi-purpose communications receiver constructed in accordance with the conventional prior art teachings.

Reference is first made to FIGURE 1 for discussion of the prior art arrangement typically utilized to provide a communications receiver receptive to various types of modulated signal information. Receiver 10 is a double conversion type receiver, with the incoming signal at antenna 11 being first applied to RF amplifier 12, the output of which is applied to first mixer stage 14. First mixer stage 14 also receives the fixed frequency signal from first oscillator stage 16, typically of the crystal controlled variety. These signals are suitably heterodyned within mixer stage 14, such that the output signal thereof presented to IF amplifier 18 will be within the pass band of said IF amplifier. The signal is then suitably amplified by IF amplifier 18 which may contain one or more stages, and then presented to a second mixer stage 20. A second oscillator 22 of the variable frequency variety is also presented to said second mixer stage, with the heterodyned output thereof being applied to the input of a fixed band pass IF amplifier 26, usually designed to operate at about 455 kilocycles. It is noted that the provision 24 for tuning the output frequency of second oscillator 22 will tune in the receiver according to the frequency of the incoming signal. An AGC signal is typically fed back through one or more of the stages 12, 18 and 26, in the well known conventional manner, to maintain consistency of output levels with varying signal strength.

The output signal 27 appearing at the last stage of IF amplifier arrangement 26 is then presented to a suitable detector arrangement, in accordance with the particular type of modulation being received. Consequently, in order to receive all the various types of modulation commonly encountered, such a receiver would necessitate a separate linear detector 52, square law detector 54, product detector 56, and FM discriminator and limiter arrangement 58, 58'. Also, a rather elaborate mode selector switching arrangement, generally shown as 60, would be required to present the output signal 27 from the IF amplifier stage 26 to the appropriate one of the various detectors 52–58 shown.

More specifically, the linear detector 52 is provided for the reception of conventional AM signals (e.g., DSB with full carrier strength). Square law detector 54 is provided for the reception of AM signals having a carrier but lacking one side band, or the reception of conventional AM signals with selectable side band, the other side band being rejected to minimize the effects of adjacent channel interference. The product detector 56 is provided for the reception of suppressed carrier signals (SSB or DSSC) and CW signals. It is to be noted that the use of the product detector also necessitates the energization of a local oscillator 57 for the combination of a carrier injection signal with the signal 27 received from the IF amplifier 26. These dual signals are mixed together in the product detector 56, with their product being the modulating intelligence signal (e.g., audio). The output of the product detector 56 is bypassed to all other but the intelligence signal. Local oscillator 57 likewise provides the necessary beat signal for CW reception in the conventional manner. FM discriminator-limiter 58, 58' is provided for the reception of FM and PM signals.

The output of the selected one of the detectors 52, 54, 56, 58 is then presented to audio amplifier 62, wherein it iis suitably amplified for presentment to receiver speaker 64.

It will be noted that the arrangement shown in FIGURE 1 is quite complex, cumbersome and expensive; as is evidenced by the numerous alternate detectors required, the complex mode switching 60 required, and the multiple automatic gain circuitry which would be needed to prevent overloading of the front end upon the reception of strong signals.

Figure 2:
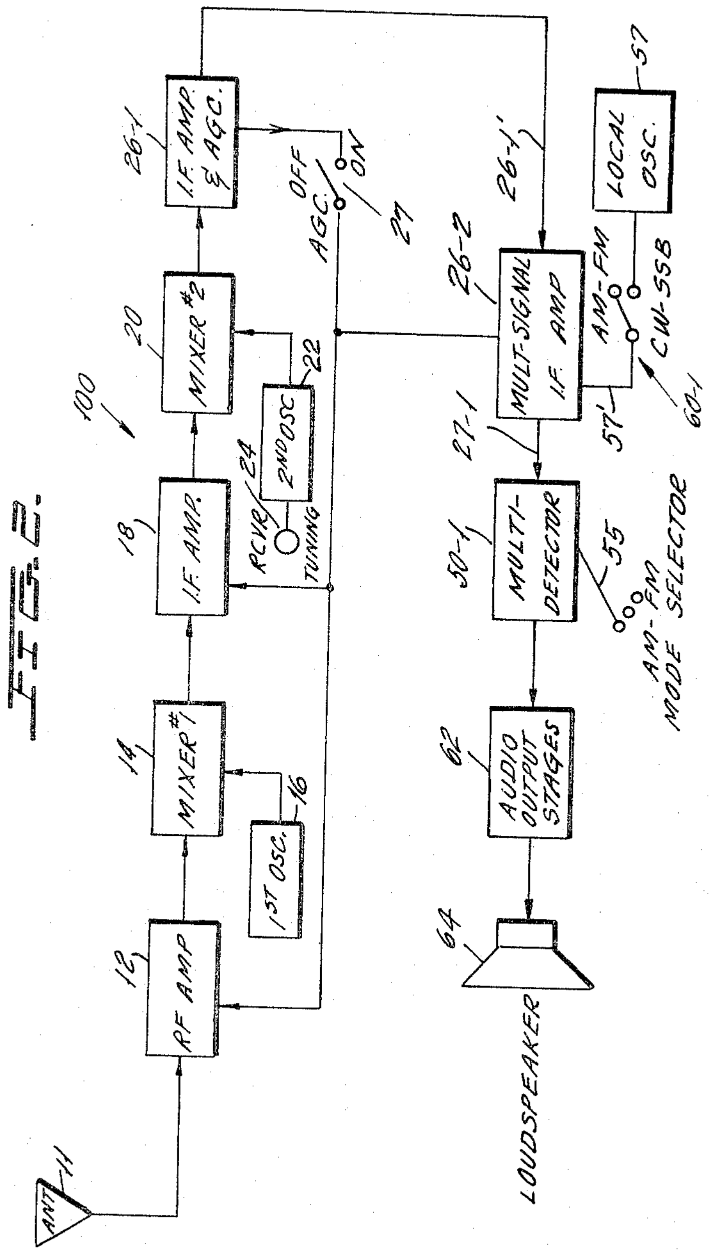
FIGURE 2 is a similar block diagram indicating the manner in which my invention may be utilized to achieve the same results as in FIGURE 1, and demonstrating the substantial simplification achieved thereby.

Reference is now made to FIGURE 2, which shows the multipurpose communications receiver constructed in accordance with my invention. A double conversion receiver is also shown, corresponding in heterodyning techniques to that shown in FIGURE 1. However, it is understood that my invention may likewise be applied in conjunction with other types of well known receiver apparatus.

Circuit components 11, 12, 14, 16, 18, 20, 24, 62 and 64 correspond essentially to those used in the prior art receiver of FIGURE 1, and it is not believed that a further description of their function is necessary at this time. The second IF amplifier stage (shown as 26 in FIGURE 1) will typically include a number of individual stages, with the particular number selected of course being dictated by individual receiver design. The last stage, shown as 26–2 of FIGURE 2, is modified in accordance with my invention to provide proportional amplification of a plurality of signals being presented thereto. Incoming IF signal 26–1' is always presented thereto in a manner such that it will be appreciably amplified. When operating in conjunction with those modulation types requiring the insertion of a local oscillator signal 57' for carrier injection (single side band and double side band, reduced or suppressed carrier, or continuous wave), the additional local oscillator signal 57' is combinedly presented to stage 26–2. Multi-signal amplifier stage 26–2 is suitably designed, as will be subsequently set forth in further detail, such that the amplified input signals combinedly appearing at 27–1 will maintain a fixed amplitude ratio between the intelligence bearing signal and the injected local oscillator signal. Hence, the signal 27–1 appearing during the multi-signal operation of amplifier 26–2 may, in fact, be considered to be a synthesized AM signal having full carrier strength.

During the reception of modulation types not requiring the addition of the local oscillator signal 57' (conventional AM or FM), multi-signal amplifier stage 26–2 will operate as a conventional type of IF amplifier, with the heterodyned down incoming signal 26–1' being suitably amplified and appearing as output signal 27–1 for presentment to multi-detector stage 50–1.

In order to insure proper AGC operation, it is absolutely necessary that there be no extraneous coupling of the local oscillator signal 57' into the multi-detector stage 50–1 under low signal conditions. This would necessitate costly shielding arrangements and critical adjustment of the amplifier bias. Hence, I have found it advantageous to use a separate AGC system actuated by a preceding IF stage 26–1, with a switch 27 being shown for connecting and disconnecting the AGC feedback.

Multi-detector 50–1 includes a switch 55 for varying its operation between AM and FM detection. More specifically, the circuitry of 50–1 is designed such that it may be converted between a linear diode detector for AM reception and a ratio detector for FM reception, in an extremely simplified manner, thereby adding to the versatility of the overall receiver system 100.

Reference is now made to FIGURE 3, which shows one embodiment of the multi-signal amplifier 26–2 and multi-purpose detector 50–1, which combinedly form the novel demodulation system of my invention. Stage 26–1, which precedes the multi-signal amplifier stage 26–2, corresponds to a conventional type of IF amplifier. The output signal of stage 26–1 is presented to IF transformer 40, with the amplified IF signal then being presented to the main control grid 41 of electronic tube 45 of the multi-signal amplifier stage 26–2. It will be noted that the grid 41 to which the incoming IF signal is presented is a high mu grid to insure substantial amplification of the IF signal within stage 26–2. Tube 45 may be a conventional type of pentode presently used for the IF stages of a communications receiver, such as the 6BA6 tube type. Tube 45 is appropriately biased in the well known manner, such that it will operate along the linear portion of its characteristic responsive to a dynamic input range of the IF signal presented to control grid 41. Namely, the cathode 42 of tube 45 is returned to a fixed DC level (e.g., ground), via biasing resistor 43. Screen grid 44 is appropriately biased via resistor 46 connected to the B+ supply, and bypassed to ground via capacitor 47.

In accordance with my invention, an additional signal from local oscillator 57 is presented to a secondary, lower mu grid of tube 45, such as the suppresor grid 48. Supressor grid 48 is returned to a fixed DC level (e.g., ground), via RF choke member 49. Hence, in the absence of a signal being presented from the local oscillator 57 to the suppressor grid 48, tube 45 will operate as a conventional IF amplifier.

Oscillator 57 may be of any well known design, with the particular circuit arrangement being shown here being only one of numerous such oscillators which may be used in conjunction with my invention. Hence, it is not believed that a detailed description of the operation of the oscillator is required. However, it should be noted that the supply voltage 59 to the oscillator 57 should be well regulated to insure a high degree of frequency stability in the output of oscillator 57. Oscillator 57 must also be well shielded, with the coupling lead 61 being preferably double shielded, so as to insure against the leakage of any oscillator output into the other stages of the receiver 100.

Switch 60–1 connects the B+ supply 59 to the oscillator stage 57, corresponding to the reception of those modulation types which require oscillator signal injection for multisignal operation of stage 26–2.

Stage 26–2 is preferably biased to operate class AB or B; thus, essentially no output signal will appear in the absence of an IF signal being applied to control grid 41. Since the local oscillator signal is applied to the secondary low mu grid 48, there will not be any local oscillator signal present in the output 27–1 correseponding to the stage being cut off in the absence of an IF input signal. In other words, the stage's overall gain, and hence the level of the local oscillator signal appearing at the output, will vary with the signal intensity at the control grid 41. This may be understood when considering that when a weak signal is applied to the control grid 41, fewer electrons flow past the suppressor grid 48 to the plate 59, resulting in less coupling or amplification of the low level oscillator signal. Thus, a nearly constant ratio will be maintained between the amplified output levels of an IF signal presented at control grid 41 and a local oscillator signal presented at suppressor grid 48. In practice this ratio between the two signals is adjusted such that when signal side band is being received, the single side band suppressed carrier signals will "modulate" the locally injected signals from 95–100%. When so adjusted for optimum single side band reception, satisfactory CW reception will occur. However, if desired, provision can be made to establish another ratio (e.g. 1:1) for the reception of very feeble CW signals.

It will be noted that there is no need to supply AGC to the multi-signal amplifier stage 27–1, since this stage by virtue of the aforedescribed electronic coupling intermediate its input signals maintains the proper level ratio between the output signals at all times irrespective of variations in the IF input level. AGC, however, may be used with other stages in the receiver, as shown in FIGURE 2, to prevent distortion due to overloading in these stages.

The output of stage 26–2 is likewise tuned to the IF frequency band via transformer 70, with it being understood that the superimposed carrier signal from local oscillator 57 will be within this band. The transformer primary 71 is matched to the secondary 72 in accordance with the class of operation, preferably AB or B as discussed above. Secondary 72 is center-tapped and sharply resonant at the intermediate frequency, and is of an impedance suitable for use with the diodes 74, 76 selected for detector stage 50–1. The plate terminal 77 and cathode terminal 78 of diodes 74, 76 respectively are connected to opposed terminals 79, 81 of the IF secondary coil 72. Capacitors 83, 85 are connected in series, intermediate plate terminal 84 of diode 76 and cathode terminal 86 of diode 74, with the point of connection 90 therebetween being connected to the center tap 92 of the IF secondary transformer 72 via RF choke member 87. The center tap 92 of IF secondary coil member 72 is likewise connected to the output of multi-signal amplifier stage 26–2 via capacitor member 95. Cathode 86 of diode member 74 is grounded, and output resistor 89 is shown connected from ground to the AM output terminal 55–1 of AM–FM mode selector switch 55. With switch 55 being thrown in the AM mode selection position, as shown in FIGURE 3, additional capacitor member 91 is removed from the circuit.

The above-described circuit arrangement as shown in FIGURE 3 will form a linear diode detector, so as to derive the intelligence information from the various amplitude modulated types presented to my receiver 100 (e.g., double or single side band, with full, reduced and suppressed carrier, and continuous wave).

Upon throwing switch 55 into the FM mode of operation, capacitor 91 is placed in parallel across capacitors 83, 85 and is of such a value as to bias the diodes 74, 76 insensitive to amplitude modulation. When so modified, multi-detector stage 51 operates as a conventional type of ratio detector, realizing the full benefits of noise reduction for demodulating FM signals. It wtill be noted also that in switching to the FM mode of operation the output is derived from the common terminal 90 of capacitors 83, 85 and presented to output mode selector switch terminal 55–2. Thus, either the AM signal appearing at terminal 55–1 or the FM signal appearing at 55–2 will be presented to common terminal 55–5 of the mode selector switch 55, with said signal then being presented to the audio stages 62 via coupling capacitor member 63.

FIGURE 4 shows another embodiment of the multi-signal amplifier and multi-purpose detector essentially similar to that shown in FIGURE 3, but using solid-state components. To facilitate a comparison between the operation of this circuit and that discussed in detail with reference to FIGURE 3, like components have been similarly designated but in the 100 sequence. That is, previous electron tube, IF amplifier shown at 26–1 in FIGURE 3 corresponds to transistor IF amplifier stage 126–1 of FIGURE 4, with the output thereof shown as being coupled to IF transformer 40 in FIGURE 3 now being shown as being coupled to corresponding IF amplifier 140 of FIGURE 4, etc.

Functionally, multi-signal amplifier 126–2 operates in the same manner as amplifier 26–2. However, the substitution of transistor member 145 for the previously shown electronic tube 45 necessitates a variation in the manner in which the input signals are coupled thereto. The IF output 210 from previous IF amplifier stage 126–1 is coupled to the base terminal 211 of transistor 145 in the conventional manner. The local oscillator signal 161 from oscillator 157 (energized by the closing of switch 160–1 corresponding to the reception of those modulation types requiring carrier signal injection) is transformer coupled to the emitter 208 by a coupling transformer shown as 200. That is, with a local oscillator signal 161 appearing at the primary 204 of the transformer 200, said signal is then coupled to the secondary 202 thereof for presentation to the emitter 208. Alternatively, R-C coupling may be used to inject the oscillator signal 161 into stage 126–2. Transistor 145 is suitably biased by resistors 212, 214 and 216, such that the IF input signal applied to the base and the local oscillator signal injected to the emitter thereof are linearly amplified, with a substantially constant ratio being maintained between their ouptut levels at collector terminal 206. Resistor 218 serves to limit the collector current magnitude, and is bypassed to ground by capacitor 220.

The output signal of stage 126–2 is then presented to primary 171 of the IF output transformer 170, wherein the application thereof to dual AM–FM detector stage 150–1 will then provide the intelligence signal at terminal 155–5 of mode selector switch 155. The intelligence is then presented to the audio output stages 62 (of FIGURE 2) via coupling capacitor 163. Inasmuch as the operation of the solid-state multi-detector stage 150–1 corresponds exactly to that shown as 50–1 in FIGURE 3, with the substitution of semi-conductor rectifier members 174, 176 for electronic tube diodes 74, 76 previously shown, it is not believed that a detailed description of its operation is necessary, with reference being made to the above discussion of FIGURE 3 in conjunction with the corresponding numerical designations of FIGURE 4 being sufficient.

It is therefore seen that my invention permits a substantially simplified communications receiver for operation in conjunction with the numerous types of modulated signals presently being used. It should be understood, however, that the previously described circuitry configurations constitute preferred embodiments of my invention, and variations and modifications will now be evident to those skilled in the art. Hence, it is intended that the scope of this invention be limited not to the specific disclosure herein detailed, but only by the appended claims.

The embodiments of the invention in which an exclusive privilege or property is claimed are defined as follows:

1. In a receiver apparatus for receiving incoming signals having intelligence of any of a plurality of modulation types: said modulation types are categorized as requiring either amplitude sensitive detection means or frequency sensitive detection means to derive intelligence therefrom; signal mixing and amplifying means and a multi-modulation detection means; said signal mixing and amplifying means including stages for suitably operating upon said incoming signal to heterodyne all the incoming signal types down to the same predetermined intermediate frequency band, and amplify said intermediate frequency band, the last intermediate frequency stage thereof including intermediate frequency output means tuned to said intermediate frequency band for presentment of the intermediate frequency, intelligence bearing, signal to said multi-modulation detection means; said multi-modulation means including first and second diode means and associated capacitor means including first, second and third capacitor members circuit connectable in either of a first and second circuit arrangement; one pair of opposed polarity terminals of said first and second diode means circuit connected to said intermediate frequency output means, the remaining pair of opposed polarity terminals of said first and second diode means circuit connected across the series arrangement of said first and second capacitor members; switching means for selectively switching said third capacitor member in parallel with said series arrangement for altering said multi-modulation detection means between said first and second circuit arrangements in accordance with the reception of a desired modulation type; said first circuit arrangement operating as a detector responsive to amplitude modulation, and said second circuit arrangement operating as a detector responsive to frequency modulation.

2. In a receiver apparatus as set forth in claim 1, said first circuit arrangement being a linear diode detector, and said second circuit arrangement being a ratio detector; said third capacitor member biasing said diode means to render said diode means insensitive to amplitude modulation.

3. In a receiver as set forth in claim 1, said intermediate frequency output means including an intermediate frequency transformer, having a secondary winding with first, second and central terminals; said first terminal connected to the plate terminal of said first diode means; said second terminal connected to the cathode terminal of said second diode means; and said central terminal connected, via a choke member, to the common terminal of said series arrangement of first and second capacitor members.

4. In a receiver apparatus for receiving incoming signals of any of a plurality of modulation types: said modulation types are categorized as requiring either amplitude sensitive detection means or frequency sensitive detection means to derive intelligence therefrom; signal mixing and amplifying means and a multi-modulation detection means; said signal mixing and amplifying means including stages for suitably operating upon said incoming signal to heterodyne all the incoming signal types down to the same predetermined intermediate frequency band, and amplify said intermediate frequency band, the last intermediate frequency stage thereof including intermediate frequency output means tuned to said intermediate frequency band for presentment of the intermediate frequency, intelligence bearing, signal to said multi-modulation detection means; said multi-modulation means including a first and second circuit arrangement; said first circuit arrangement operating as a detector responsive to amplitude modulation, and said second circuit arrangement operating as a detector responsive to frequency modulation; switching means for selectively switching said multi-modulation detection means between said first and second circuit arrangements in accordance with the reception of a desired modulation type; at least some of said modulation types requiring carrier signal injection prior to presentation to said multi-modulation detection means; said last intermediate frequency stage being a multi-signal intermediate frequency amplifying stage; first input means tuned to a predetermined receiver intermediate frequency band for applying the received incoming signals, suitably heterodyned down to said intermediate frequency, as a first input signal to said multi-signal intermediate frequency amplifier stage; second input means tuned to a frequency within said intermediate frequency band for applying a carrier insertion signal to said multi-signal amplifier as a second input signal; circuit means for biasing said multi-signal amplifier to a predetermined operating range to amplify both of said first and second input signals while continuously maintaining a fixed amplitude ratio therebetween; said intermediate frequency output means tuned to said intermediate frequency band for presenting said amplified first and second input signals as a composite intermediate frequency signal to said multi-modulation detection means.

5. In a receiver apparatus as set forth in claim 4, said multi-modulation detection means including first and second diode means and associated first, second and third capacitor members, one pair of opposed polarity terminals of said first and second diode means circuit connected to said intermediate frequency output means, the remaining pair of opposed polarity terminals of said first and second diode means circuit connected across the series arrangement of said first and second capacitor members, said switching means placing said third capacitor member in parallel with said series arrangement for switching between said first and second circuit arrangement; said first circuit arrangement being a linear diode detector, and said second circuit arrangement being a ratio detector.

6. A receiver apparatus as set forth in claim 4, wherein: said second input means includes a coupling component associated with the coupling of said second input signal to said multi-signal amplifier stage; said coupling component being an R-F choke for returning a terminal of said multi-signal amplifier stage to a fixed DC level in the absence of said input signal, whereby said multi-signal amplifier stage is operable in a first condition as a single signal amplifier in the absence of said second input signal, and in a second condition as a multi-signal amplifier upon the presence of said second input signal; said first condition corresponding to the reception of an incoming signal modulating type including a suitable carrier level for subsequent detection thereof; said second condition corresponding to the reception of an incoming signal modulation type requiring the injection of a carrier signal for subsequent detection thereof; said multi-signal amplifier and multi-modulated detection means combinedly providing demodulation of incoming signal modulation types requiring AM or FM detection, with and without carrier signal injection.

7. A receiver apparatus as set forth in claim 4, wherein: said multi-signal intermediate frequency amplifying stage including an electronic device having at least a first and second input terminal; the presentment of a signal to said first input terminal providing substantially greater amplification thereof than the presentment of a corresponding signal to said second input terminal; said first input means applying said first input signal to said first input terminal; and said second input means applying said second input signal to said second input terminal; said second input means including an associated coupling component connecting said second terminal to a fixed D.C. level; said coupling component being an R-F choke for returning said second terminal to a fixed D.C. level in the absence of said second input signal, whereby said multi-signal intermediate frequency amplifier stage is operable in a first condition as a single signal amplifier in the absence of said second input signal, and in a second condition as a multi-signal amplifier upon the presence of said second input signal; said first condition corresponding to the reception of an incoming signal modulation type including a suitable carrier level for subsequent detection thereof; said second condition corresponding to the reception of an incoming signal modulation type requiring the injection of a carrier signal for subsequent detection thereof; said multi-signal intermediate frequency amplifier and multi-modulated detection means combinedly providing demodulation of incoming signal modulation types requiring AM or FM detection, with and without carrier signal injection.

8. A receiver apparatus as set forth in claim 7, wherein: said first circuit arrangement being a linear diode detector, and said second circuit arrangement being a ratio detection, both operable to intermediate frequency signals of the same band; said first and second circuit arrangements including common diode and impedance means, with said common diode and impedance means alone forming said first circuit arrangement; said switching means circuit connecting additional circuit means to said first circuit arrangement for forming said second circuit arrangement; said additional circuit means biasing said common diode means to render said common diode means insensitive to amplitude modulation; said impedance means included within the linear detector of said first circuit arrangement.

9. In a receiver apparatus for receiving incoming signals of any of a plurality of modulation types, at least some of said modulation types requiring carrier signal injection to derive intelligence therefrom; signal mixing and amplifying means and signal detection means; said signal mixing and amplifying means including stages for suitably operating upon said incoming signal to heterodyne all the incoming signal types down to the same predetermined intermediate frequency band, and amplify said intermediate frequency band; the last intermediate frequency stage being a multi-signal intermediate frequency amplifying stage; first input means tuned to the predetermined receiver intermediate frequency band for applying the received incoming signals, suitably heterodyned down to said intermediate frequency, as a first input signal to said multi-signal intermediate frequency amplifier stage; second input means tuned to a frequency within said intermediate frequency band for applying a carrier insertion signal to said multi-signal amplifier as a second input singal; circuit means for biasing said multi-signal amplifier to a predetermined operating range to amplify both of said first and second input signals while continuously maintaining a fixed amplitude ratio therebetween; the absence of a signal input at said first input means serving to prevent the carrier insertion signal at said second input means from appearing at the output means of said multi-signal intermediate frequency amplifying stage; said intermediate frequency output means tuned to said intermediate frequency band for presenting said amplified first and second input signals as a composite intermediate frequency signal to said signal detection means; said signal detection means including circuit means for receiving said amplified IF signals from said last intermediate frequency stage and extracting the intelligence therefrom.

10. In a receiver as set forth in claim 9:
said signal detection means being a multi-modulation detection means, and including circuit means for extracting intelligence from a plurality of different modulation types.

References Cited

UNITED STATES PATENTS

| | | | |
|---|---|---|---|
| 2,187,978 | 1/1940 | Lewis | 325—330 |
| 2,561,088 | 7/1951 | Anderson | 329—204 |
| 2,773,178 | 12/1956 | Van Abbe et al. | 325—317 |
| 2,811,638 | 10/1957 | Regnier | 325—330 |
| 3,182,261 | 5/1965 | Broadhead et al. | 325—315 |
| 3,222,606 | 12/1965 | Steup | 329—1 |

KATHLEEN H. CLAFFY, *Primary Examiner.*

RICHARD MURRAY, *Examiner.*

A. H. GESS, *Assistant Examiner.*